United States Patent
Yoshioka et al.

(10) Patent No.: US 9,863,378 B2
(45) Date of Patent: Jan. 9, 2018

(54) INTAKE AIR TEMPERATURE CONTROL APPARATUS FOR VEHICLE ENGINE

(71) Applicant: AISAN KOGYO KABUSHIKI KAISHA, Obu-shi, Aichi-ken (JP)

(72) Inventors: Mamoru Yoshioka, Nagoya (JP); Minoru Akita, Ama (JP); Tsutomu Kuniyoshi, Tokai (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 60 days.

(21) Appl. No.: 15/070,349

(22) Filed: Mar. 15, 2016

(65) Prior Publication Data

US 2016/0281655 A1 Sep. 29, 2016

(30) Foreign Application Priority Data

Mar. 27, 2015 (JP) ................... 2015-066415

(51) Int. Cl.
| | |
|---|---|
| *F02G 5/00* | (2006.01) |
| *F02M 31/04* | (2006.01) |
| *F02M 31/093* | (2006.01) |
| *F02M 35/10* | (2006.01) |
| *F02M 31/083* | (2006.01) |
| *F02M 31/14* | (2006.01) |

(52) U.S. Cl.
CPC ........ *F02M 31/042* (2013.01); *F02M 31/093* (2013.01); *F02M 31/083* (2013.01); *F02M 31/145* (2013.01); *F02M 35/10255* (2013.01); *F02M 35/10268* (2013.01); *Y02T 10/126* (2013.01)

(58) Field of Classification Search
CPC ............... F02M 31/042; F02M 31/093; F02M 35/10255; F02M 35/10268; F02M 31/145; F02M 31/083; Y02T 10/126
USPC ......................................................... 123/556
See application file for complete search history.

(56) References Cited

U.S. PATENT DOCUMENTS 3,830,210 A * 8/1974 Muller .................. F02M 31/06
123/552
4,078,379 A * 3/1978 Minami .................. F02D 35/00
123/701

(Continued)

FOREIGN PATENT DOCUMENTS

| JP | 59093955 A | * | 5/1984 |
| JP | H11-141415 A | | 5/1999 |

(Continued)

*Primary Examiner* — Hung Q Nguyen
(74) *Attorney, Agent, or Firm* — Oliff PLC

(57) ABSTRACT

An engine, an intake passage to introduce intake air to the engine, an exhaust passage to discharge exhaust air from the engine, and a high-temperature duct connected to the intake passage to introduce high-temperature air around the exhaust passage into the engine are provided in an engine compartment. The intake passage includes an intake-air inlet port to introduce outside air as low-temperature air. A passage switching valve provided between the intake passage and the high-temperature duct switches passages of the high-temperature air from the high-temperature duct and the low-temperature air from the intake air inlet port so as to selectively flow the air downstream of the intake passage. A valve control unit controls switching according to the temperature inside the compartment.

8 Claims, 8 Drawing Sheets

(56) References Cited

U.S. PATENT DOCUMENTS

| | | | | |
|---|---|---|---|---|
| 4,144,857 A | * | 3/1979 | Bendig | F02M 31/062 123/556 |
| 2003/0029852 A1 | * | 2/2003 | Ozawa | F01P 7/12 219/205 |

FOREIGN PATENT DOCUMENTS

| | | |
|---|---|---|
| JP | H11-158917 A | 6/1999 |
| JP | 2000-234568 A | 8/2000 |
| JP | 2008-008264 A | 1/2008 |

* cited by examiner

41: ENGINE COMPARTMENT TEMP. SENSOR
43: AIR FLOWMETER

INTAKE AIR TEMPERATURE CONTROL APPARATUS FOR VEHICLE ENGINE

CROSS-REFERENCE TO RELATED APPLICATIONS

This application is based upon and claims the benefit of priority from the prior Japanese Patent Application No. 2015-066415, filed Mar. 27, 2015, the entire contents of which are incorporated herein by reference.

BACKGROUND OF THE INVENTION

Field of the Invention

The present invention relates to an intake air temperature control apparatus for a vehicle engine, the apparatus being configured to control a temperature of intake air which is introduced in an engine placed in an engine compartment, of a vehicle.

Related Art

Heretofore, as one technique in this field, an intake air temperature control apparatus disclosed in Japanese Patent Application Publication No. 2000-234568 (JP-A-2000-234568) has been known, for example. The apparatus includes a hot-air control valve configured to open and close each intake port for taking in warm air and outside air and a thermostat configured to maintain a temperature of intake air in a certain range, the intake air being composed of the warm air or the outside air, or both of them. To an intake port for the warm air, air having been warmed up around an exhaust manifold will be introduced. To an intake port for the outside air, the outside air will be introduced. Herein, the thermostat is disposed in an intake passage downstream of both the intake ports, and therefore the thermostat is configured to be operated in response to the intake air temperature in the intake passage to control an opening degree of the hot-air control valve. In other words, the opening degree of the hot-air control valve is controlled according to the intake air temperature, and thus the temperature of the intake air which will be introduced in the engine is controlled.

SUMMARY OF INVENTION

Problems to be Solved by the Invention

However, in the intake air temperature control apparatus described in JP-A-2000-234568, the hot-air valve is controlled its opening degree according to the intake air temperature, and hence, even when the hot-air control valve is switched to open the intake port for the warm air, there is a possibility that cold air is introduced in the engine before the engine is warmed up. Further, when the warm air is introduced, the temperature of the thermostat is suddenly changed and thereby the opening degree of the hot-air control valve is also suddenly changed. This could cause failure in proper control of temperature of the intake air introduced in the engine.

The present invention has been made in view of the above circumstances and has a purpose of providing an intake air temperature control apparatus for a vehicle engine enabling to appropriately control a temperature of intake air introduced in an engine in accordance with a warmed state of the engine.

Means of Solving the Problems

To achieve the above purpose, one aspect of the present invention provides an intake air temperature control apparatus for a vehicle engine configured to control a temperature of intake air which will be introduced in an engine placed in an engine compartment of a vehicle, wherein the intake air temperature control apparatus comprises: an intake passage placed in the engine compartment to introduce the intake air to the engine, the intake passage including an intake air inlet port to introduce outside air as low-temperature air therethrough; an exhaust passage partly placed in the engine compartment to discharge exhaust air from the engine; a high-temperature air passage placed in the engine compartment and connected to the intake passage to introduce high-temperature air around the exhaust passage to the engine; a passage switching valve provided in connecting portions of the intake passage and the high-temperature air passage and configured to switch passages to selectively flow the high-temperature air from the high-temperature air passage and the low-temperature air from the intake air inlet port to a downstream side of the intake passage; and a valve control unit to control a switching operation of the passage switching valve according to a temperature inside the engine compartment.

Effects of the Invention

According to the present invention, a temperature of intake air introduced in an engine can be appropriately controlled in accordance with a warmed state of the engine.

DESCRIPTION OF EMBODIMENTS

First Embodiment

A first embodiment embodying an intake air temperature control apparatus for a vehicle engine of the present invention is now explained below in detail with reference to the accompanying drawings.

Figure 1:
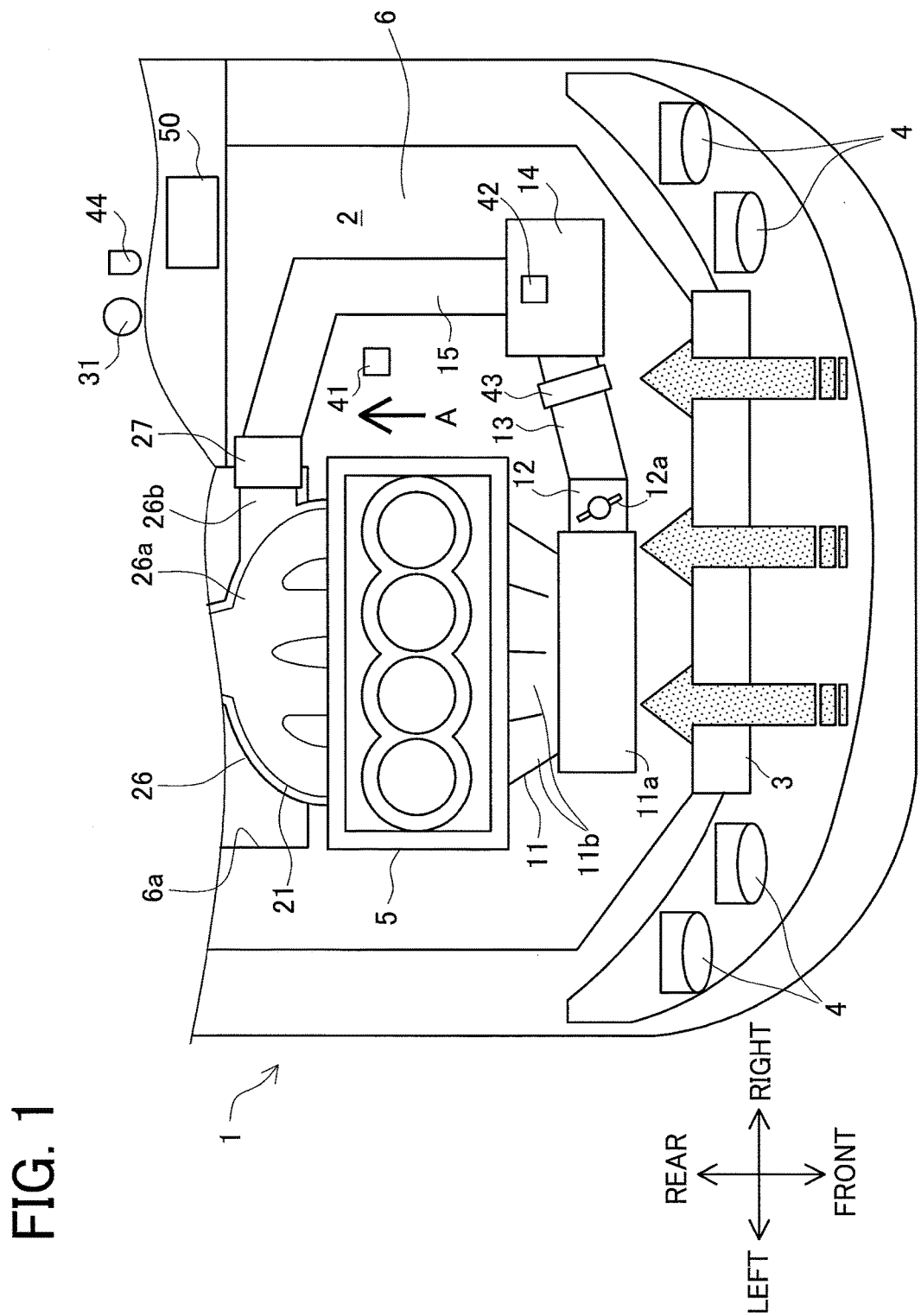
FIG. 1 is a schematic plan view of a vehicle front part from which a hood is removed in a first embodiment.
Figure 2:
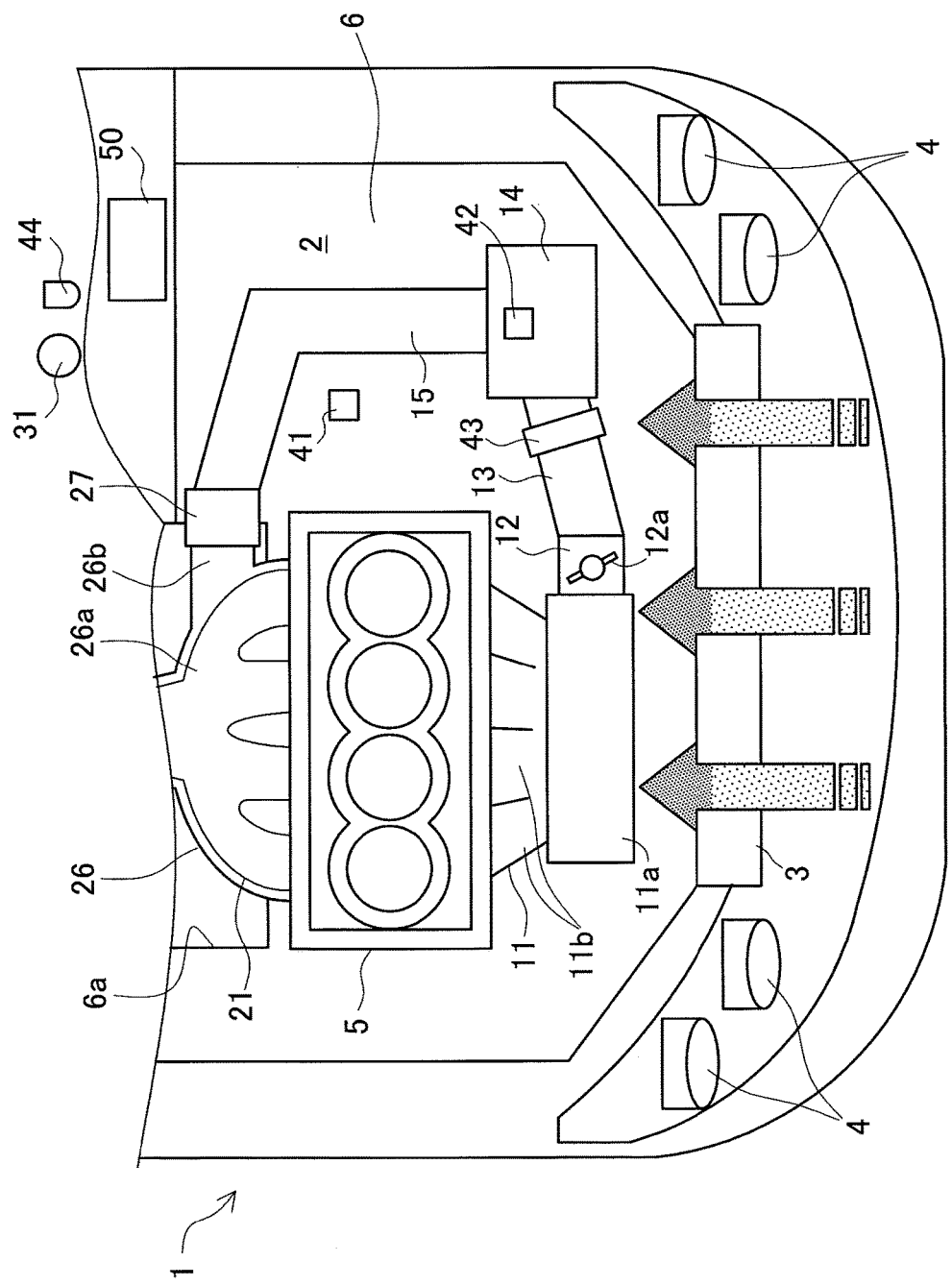
FIG. 2 is another schematic plan view of the vehicle front part from which the hood is removed in the first embodiment.
Figure 3:
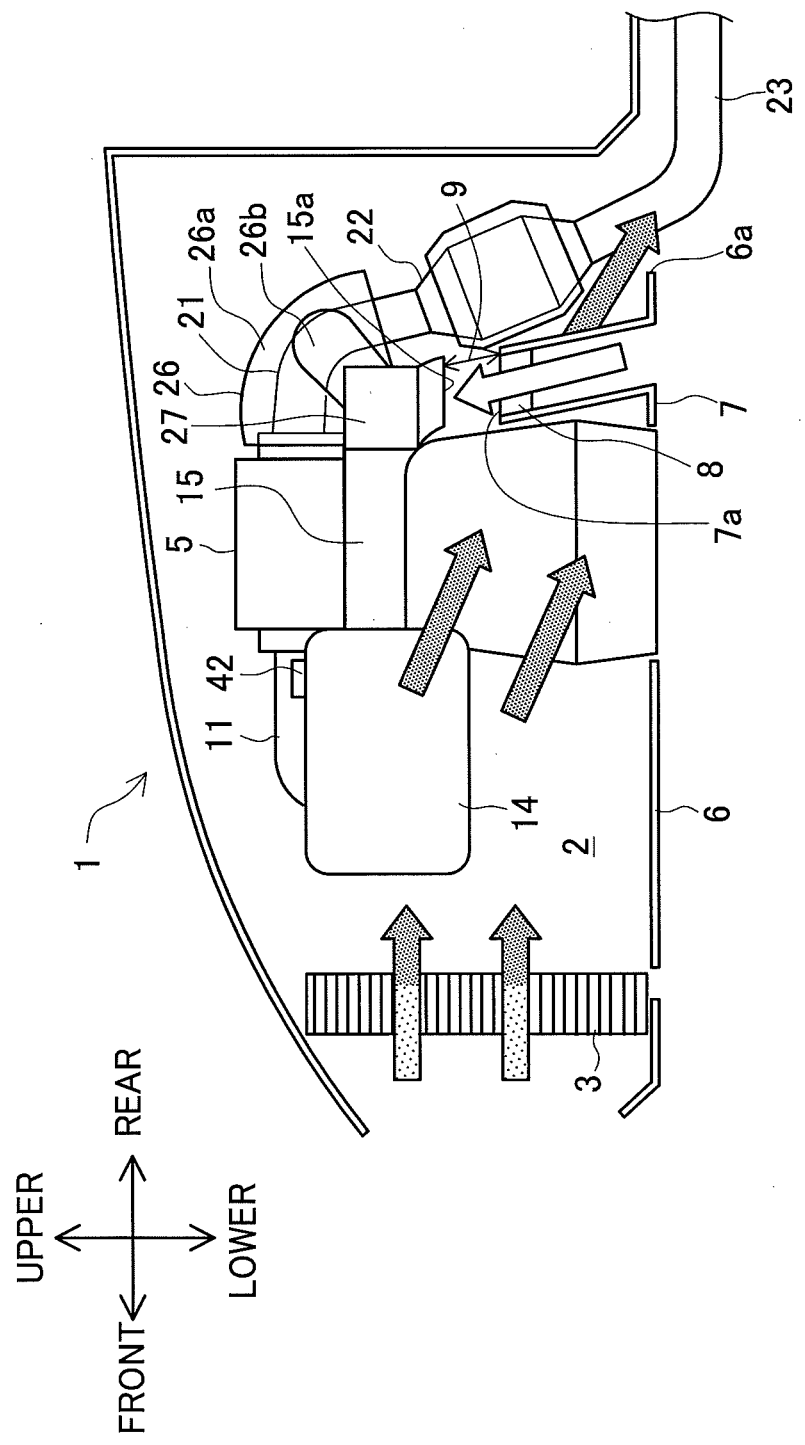
FIG. 3 is a schematic side view of an internal configuration of an engine compartment which is placed in the vehicle front part in the first embodiment.

FIGS. 1 and 2 are schematic plan views each showing a front part of a vehicle 1 from which a hood has been removed. In FIG. 1, front and rear directions and left and right directions are indicated with double-headed arrows (the same applies to FIG. 2). FIG. 3 is a schematic side view showing an inside of an engine compartment 2 which is placed in a front part of the vehicle 1. In FIG. 3, the front and rear directions and upper and lower directions of the vehicle 1 are, respectively, indicated with a left-right arrow and an up-down arrow. In FIGS. 1 to 3, thick arrows represent "air flow" and depth differences in "shading (hatching)" of the arrows represent differences in degrees of their temperature. Namely, the deeper the shading is, the higher the temperature is (the same applies to other drawings which will be explained later). In the engine compartment 2, a radiator 3 is disposed in a front center part of the compartment 2, and air, which is taken through a front face of the vehicle 1, will pass through the radiator 3 and flow in the engine compartment 2. At a rear side of the radiator 3, an engine 5, an intake passage, and an exhaust passage are placed. Herein, the radiator 3 is provided with a coolant passage (not shown) such that a coolant, which has cooled down the engine 5 and been warmed up to become warm water, circulates through the radiator 3 for heat exchanging. At a cold start of the engine 5, however, the coolant, which has been warmed up in the engine 5, is made to detour (bypass) the radiator 3 and return to the engine 5 so that warming up of the engine 5 is facilitated. Subsequently, a temperature of the coolant is increased while the engine 5' is being warmed up, and when warming up of the engine 5 is completed, the coolant at high temperature (warm water) is made to flow in the radiator 3.

On both left and right sides of the radiator 3, headlights 4 are provided. In the engine compartment 2, the engine 5 is placed sideways. On a front side of the engine 5, an intake manifold 11 for introducing air (intake air) to a combustion chamber (not shown) is provided. On a rear side of the engine 5, an exhaust manifold 21 for discharging exhaust air from the combustion chamber is provided. On a downstream side of the exhaust manifold 21, an exhaust pipe 23 is connected via a catalytic converter 22 for purification of the exhaust air. The exhaust manifold 21, the catalytic converter 22, and the exhaust pipe 23 constitute one example of an exhaust passage of the present invention. The engine compartment 2 is formed with an undercover 6 covering a lower side (a bottom part) of the compartment 2. In a rear part of the engine compartment 2, the undercover 6 is provided with an opening portion 6a opening into outside of the vehicle and facing a road surface. The exhaust pipe 23 passes through this opening portion 6a and extends to a rear part of the vehicle 1.

An inlet side of the intake manifold 11 is connected with a first intake pipe 13 via a throttle device 12. A leading end of the first intake pipe 13 is provided with an air cleaner 14. An inlet port of the air cleaner 14 is connected with a second intake pipe 15. These components of the intake manifold 11, the throttle device 12, the first intake pipe 13, the air cleaner 14, and the second intake pipe 15 constitute one example of an intake passage of the present invention. This intake passage is configured to introduce air (intake air) to the combustion chamber of the engine 5. The intake manifold 11 includes a surge tank 11a and a plurality of branch pipes 11b. The throttle device 12 includes a throttle valve 12a. The throttle device 12 is fixed at a right end of the surge tank 11a that is disposed sideways. The first intake pipe 13 extends in a right direction from the throttle device 12 and is connected with the air cleaner 14. The second intake pipe 15 extends from the air cleaner 14 in a rear direction and then bend left at its half way. The second intake pipe 15 includes at its leading end an intake-air inlet port 15a. The intake-air inlet port 15a is adjacent to the opening portion 6a of the undercover 6 and placed to face the opening portion 6a. The engine 5, the intake manifold 11, the throttle device 12, the first intake pipe 13, the air cleaner 14, the second intake pipe 15, the exhaust manifold 21, the catalytic converter 22, and the exhaust pipe 23 are positioned on a rear side of the radiator 3 in the engine compartment 2.

As shown in FIG. 3, in the present embodiment, the opening portion 6a of the undercover 6 is provided with a guide duct 7 to guide outside air to the intake-air inlet port 15a of the second intake pipe 15. This guide duct 7 provided in a part of the opening portion 6a is of a cylindrical shape extending toward the intake-air inlet port 15a from the opening portion 6a. The guide duct 7 is formed with a filter 8 to collect or trap foreign matters in the air. Further, there is an opening area 9 provided between the intake-air inlet port 15a and a leading outlet port 7a of the guide duct 7. In other words, the intake-air inlet port 15a and the outlet port 7a are not connected but spaced apart with a predetermined distance.

As shown in FIGS. 1 and 2, in the present embodiment, a high-temperature duct 26 is provided in the engine compartment 2 to collect high-temperature air around the exhaust manifold 21. The high-temperature duct 26 includes a shroud 26a covering the surroundings of the exhaust manifold 21 with a clearance and a conduit 26b extending from the shroud 26a. An outlet of the conduit 26b is connected with the second intake pipe 15. The high-temperature duct 26 corresponds to one example of a high-temperature air passage of the present invention. A passage switching valve 27 is provided in connecting portions of the conduit 26b and the second intake pipe 15. This passage switching valve 27 is configured to switch passages such that high-temperature air from the high-temperature duct 26 and low-temperature air (outside air) from the intake-air inlet port 15a are selectively made flown to a downstream side of the second intake pipe 15. In the present embodiment, the passage switching valve 27 is constituted of an electric valve. As shown in FIGS. 1 and 2, in the intake passage downstream of the passage switching valve 27, namely in the air cleaner 14, an intake air temperature sensor 42 to detect a temperature of intake air flowing in the air cleaner 14 as an intake air temperature THA. This intake air temperature sensor 42 corresponds to one example of an intake air temperature detection unit of the present invention. Further, the first intake pipe 13 is provided with an air flowmeter 43 to detect an intake air amount Ga of the intake air flowing in the pipe 13. Furthermore, in the engine compartment 2, an engine compartment temperature sensor 41 to detect a temperature in the engine compartment 2 as an engine compartment temperature THEC is provided. This engine compartment temperature sensor 41 corresponds to one example of an engine compartment temperature detection unit of the present invention. A driver's seat of the vehicle 1 is provided with an ignition switch (IG switch) 44 to be operated for start and stop of the engine 5 and an alarm lamp 31 to inform abnormality of the passage switching valve 27. Further, the vehicle 1 is provided with an electronic control unit (ECU) 50 to control the passage switching valve 27 based on detected values detected by the sensors and others 41 to 44.

Figure 4:
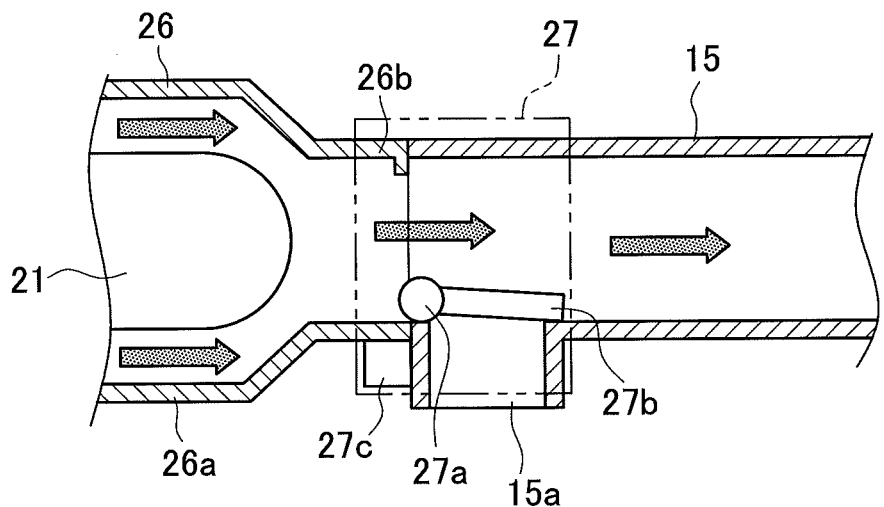
FIG. 4 is a schematic sectional view of connecting portions of a high-temperature duct and a second intake pipe and a passage switching valve seen in a direction of an arrow A in FIG. 1 in the first embodiment.
Figure 5:
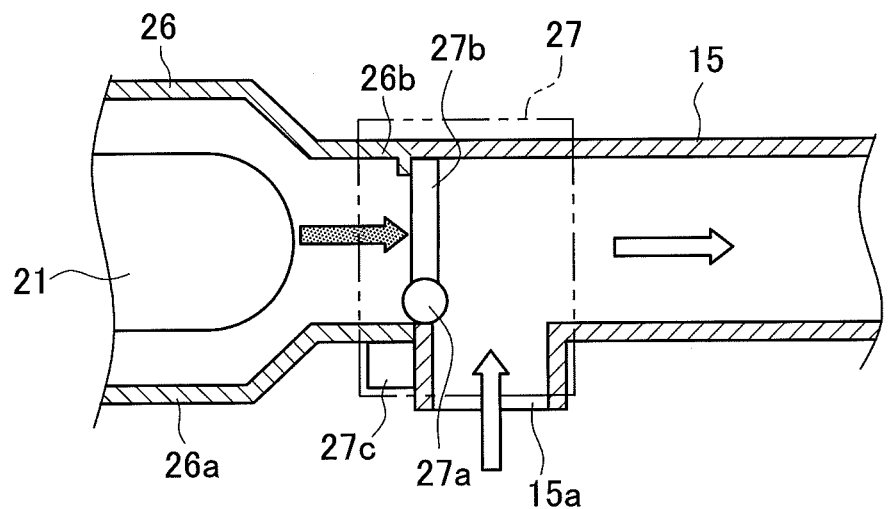
FIG. 5 is another schematic sectional view of the connecting portions of the high-temperature duct and the second intake pipe and the passage switching valve seen in the direction of the arrow A in FIG. 1 in the first embodiment.

FIGS. 4 and 5 are schematic sectional views each showing the connecting portions of the high-temperature duct 26 and the second intake pipe 15 and the passage switching valve 27 seen in a direction of an arrow A in FIG. 1. The passage switching valve 27 includes a rotary shaft 27a, a valve element 27b configured to be moved by rotation of the shaft 27a, and a motor 27c to drive the valve element 27b. The valve element 27b is configured to switch its position between a high-temperature air position shown in FIG. 4 and a low-temperature air position shown in FIG. 5 by rotation of the rotary shaft 27a. In the high-temperature air position in FIG. 4, low-temperature air (outside air) taken through the intake air inlet port 15a is shut off, and high-temperature air around the exhaust manifold 21 is introduced through the high-temperature duct 26 to the second intake pipe 15. In the low-temperature air position in FIG. 5, the high-temperature air from the high-temperature duct 26 is shut off, and the low-temperature air (outside air) taken through the intake-air inlet port 15a is introduced in the second intake pipe 15.

Figure 6:
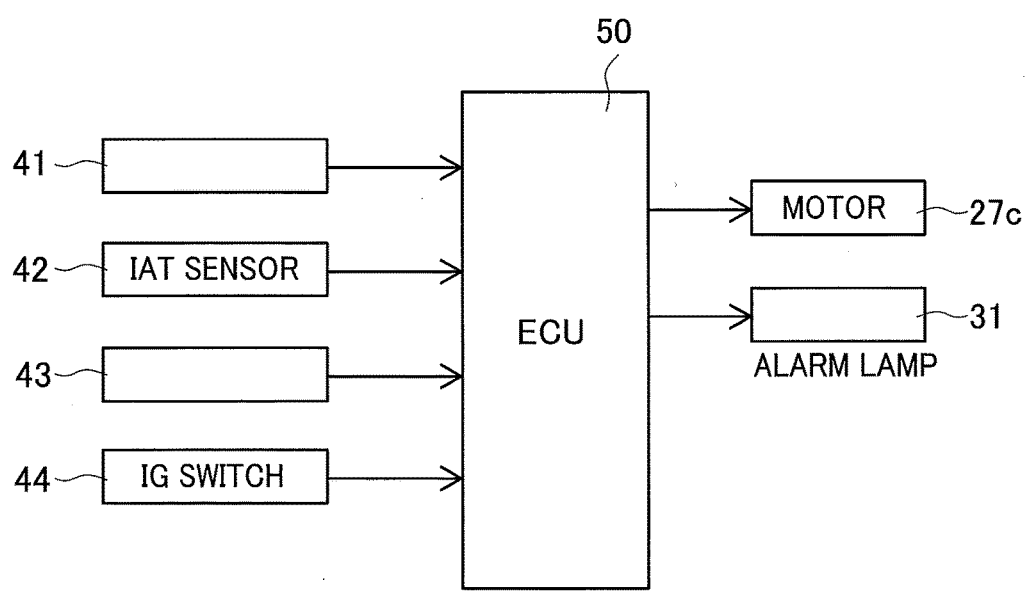
FIG. 6 is a block diagram illustrating an electrical configuration of an intake air temperature control apparatus in the first embodiment.

FIG. 6 is a block diagram showing an electrical configuration of an intake air temperature control apparatus of the present embodiment. On an input side, the engine compartment temperature sensor 41, the intake air temperature sensor 42 (in the figure, indicated as an IAT sensor), the air flowmeter 43, and the IG switch 44 are connected to the ECU 50. On an output side of the ECU 50, the motor 27c of the passage switching valve 27 and the alarm lamp 31 are connected. The ECU 50 corresponds to one example of a valve control unit of the present invention and is configured to control the passage switching valve 27 based on the detected compartment temperature THEC so as to carry out the intake air temperature control.

Figure 7:
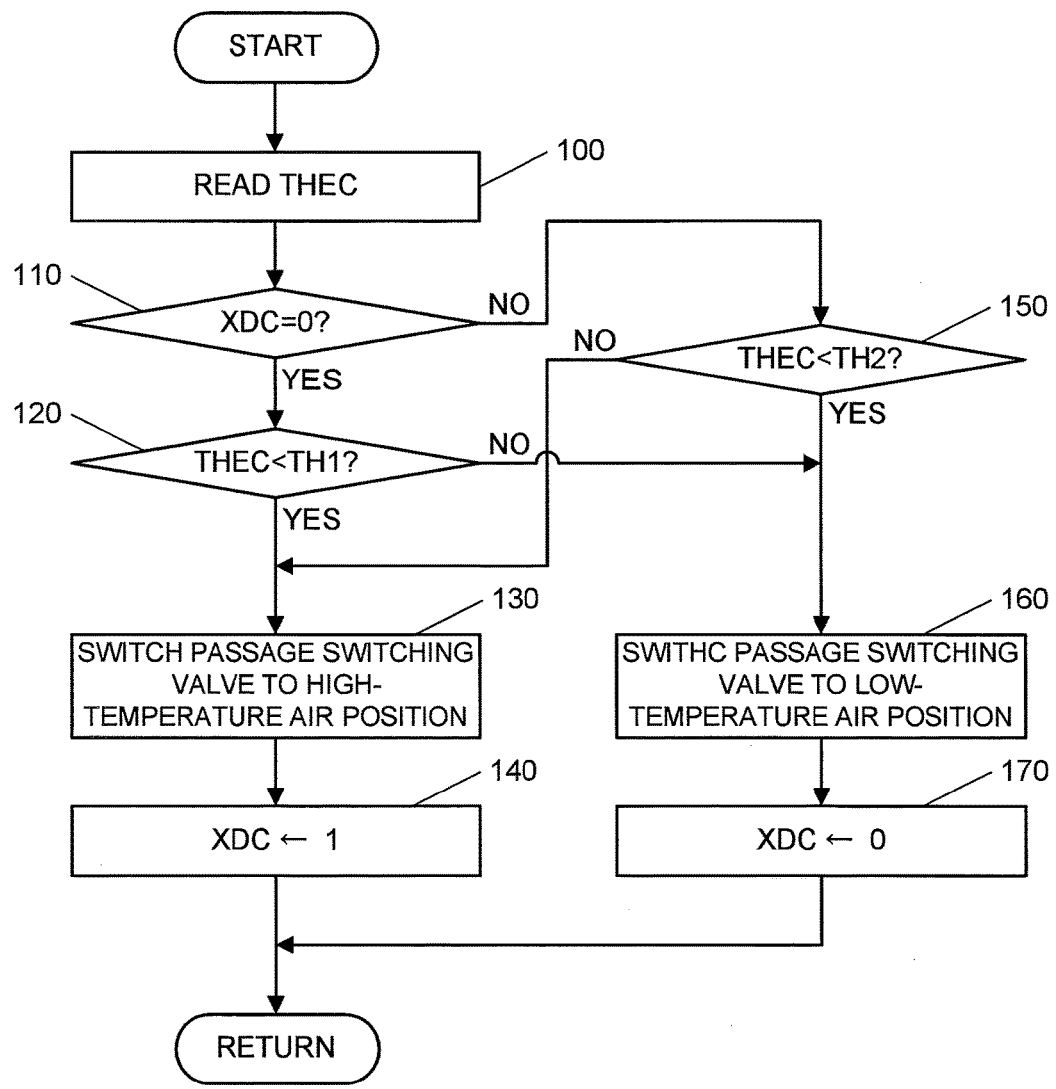
FIG. 7 is a flow chart showing a process of an intake air temperature control in the first embodiment.

The intake air temperature control carried out by the ECU 50 is now explained. FIG. 7 is a flow chart illustrating a process of the intake air temperature control. When a process proceeds to this routine, in a step 100, the ECU 50 reads the engine compartment temperature THEC based on a detected value detected by the engine compartment temperature sensor 41.

Subsequently, in a step 110, the ECU 50 determines whether or not a passage switching flag XDC is "0." As it will be mentioned later, the passage switching flag XDC is set to "1" when the passage switching valve 27 is switched to the high-temperature air position and set to "0" when the valve 27 is switched to the low-temperature air position. When a determination result in the step 110 is affirmative, the ECU 50 proceeds the process to a step 120, and when the determination result is negative, the process is moved to a step 150.

In the step 120, the ECU 50 determines whether or not the engine compartment temperature THEC is lower than a first predetermined value TH1. As the first predetermined value TH1, for example, "30° C." may be applied. When a determination result in the step 120 is affirmative, the ECU 50 proceeds the process to a step 130, and when the result is negative, the process is moved to a step 160.

In the step 130, the ECU 50 controls the passage switching valve 27 to switch to the high-temperature air position. Thus, as shown in FIG. 4, the high-temperature air is introduced from the high-temperature duct 26 to the second intake pipe 15.

Then, in a step 140, the ECU 50 sets the passage switching flag XDC to "1," and the process returns to the step 100.

On the other hand, in a step 150 proceeded from the step 110, the ECU 50 determines whether or not the engine compartment temperature THEC is lower than a second predetermined value TH2 (TH1<TH2). As the second predetermined value TH2, for example, "35° C." may be applied. When the determination result in the step 150 is affirmative, the ECU 50 proceeds the process to a step 160, and when the result is negative, the process is moved to the step 130.

In the step 160, proceeded from the step 150 or the step 120, the ECU 50 controls the passage switching valve 27 to switch to the low-temperature air position. Thus, as shown in FIG. 5, the low-temperature air is introduced from the intake air inlet port 15a to the second intake pipe 15.

Subsequently, in a step 170, the ECU 50 sets the passage switching flag XDC to "0," and the process returns to the step 100.

According to the above-mentioned intake air temperature control apparatus for a vehicle engine of the present embodiment, during operation of the engine 5, outside air flowing through the opening portion 6a of the undercover 6 into the engine compartment 2 does not pass through the radiator 3, and therefore the temperature of the air is as low as the air outside the vehicle even after completion of warming up of the engine 5. Herein, the intake-air inlet port 15a of the second intake pipe 15 is placed adjacent to the opening portion 6a of the undercover 6. Therefore, the outside air at low temperature flowing through the opening portion 6a into the engine compartment 2 is taken in the second intake pipe 15 through the intake air inlet port 15a. Accordingly, even when the inside of the engine compartment 2 which is provided with the intake passage (the intake manifold 11, the throttle device 12, the first intake pipe 13, the air cleaner 14, and the second intake pipe 15) is in a high-temperature state after completion of warming up of the engine 5 or the like, the intake passage is prevented from taking in high-temperature air. As a result, it is enabled to prevent decline in air density of the air introduced in the combustion chamber of the engine 5, and hence it is enabled to prevent decrease in output of the engine 5 due to reduction in an actual intake air amount.

Herein, the opening portion 6a of the undercover 6 is formed with the exhaust pipe 23 and others which will be increased their temperature, but the opening portion 6a has low heat exchanging performance as compared with the radiator 3. Therefore, even if the opening portion 6a is formed with the exhaust pipe 23 and others, the outside air at the low temperature can be introduced through the opening portion 6a into the engine compartment 2 from outside. Especially, when the intake amount of the engine 5 is increased, the outside air at the low temperature gets easily taken into the intake passage.

In the present embodiment, the guide duct 7 provided in the opening portion 6a of the undercover 6 is configured to direct the outside air to the intake-air inlet port 15a of the second intake pipe 15, and thus the outside air is easily taken into the intake-air inlet port 15a. Accordingly, the outside air can be easily taken into the intake passage even in acceleration of the engine 5, so that it is possible to restrain knocking of the engine 5.

In the present embodiment, there is provided the opening area 9 between the intake-air inlet port 15a of the second intake pipe 15 and the guide duct 7, and thus manifold vacuum acting on the intake-air inlet port 15a is relaxed in the opening area 9, and intrusion of drops of water, snow, and others from the opening portion 6a to the guide duct 7 is less likely to happen. Accordingly, drops of water, snow or the like are prevented from being taken into the engine 5.

In the present embodiment, the filter 8 is provided in the guide duct 7, and this filter 8 collects or traps foreign matters such as scattering stones having entered the guide duct 7 through the opening portion 6a. Therefore, it is possible to prevent the foreign matters such as scattering stones from entering in the intake passage including the second intake pipe 15 and others.

Further, in the present embodiment, the high-temperature air which has been warmed up around the exhaust manifold 21 during operation of the engine 5 is collected by the high-temperature duct 26. The passages are switched by the passage switching valve 27 which is provided in the connecting portions of the high-temperature duct 26 and the second intake pipe 15, and thus the high-temperature air from the high-temperature duct 26 and the low-temperature air (outside air) from the intake-air inlet port 15a are selectively made flown to a downstream side of the second intake pipe 15. Accordingly, the passage switching valve 27 is configured to switch the passages as necessary, and thereby the intake air to be introduced in the combustion chamber of the engine 5 is switched between the high-temperature air and the low-temperature air (outside air). Therefore, the temperature of the intake air introduced in the combustion chamber of the engine 5 can be appropriately controlled in accordance with the warmed-up state of the engine 5. As a result, for example, at the cold start of the engine 5, the high-temperature air is introduced in the combustion chamber of the engine 5 so that starting performance of the engine 5 is improved. Further, after completion of starting the engine 5, the low-temperature air (outside air) is introduced in the combustion chamber of the engine 5, so that decline in the air density of the intake air in the combustion chamber of the engine 5 is restrained.

In the present embodiment, the ECU 50 is configured to control the passage switching valve 27 based on the engine compartment temperature THEC which is detected by the engine compartment temperature sensor 41. The intake air to be introduced in the combustion chamber of the engine 5 is thus switched between the high-temperature air and the low-temperature air according to the engine compartment temperature THEC. Accordingly, the temperature of the intake air to be introduced in the combustion chamber of the engine 5 can be precisely controlled according to the engine compartment temperature THEC. As a result, for example, at the cold start of the engine 5 in a state which the engine compartment temperature THEC is low, the high-temperature air is introduced in the combustion chamber of the engine 5, improving the starting performance of the engine 5. Further, after completion of starting the engine 5 in a state which the engine compartment temperature THEC is high, the low-temperature air (outside air) is introduced in the combustion chamber of the engine 5, restraining decline in the air density of the air in the combustion chamber of the engine 5.

Incidentally, a condition that the high-temperature air is needed for the engine 5 is that the engine compartment temperature is low, but the coolant temperature and the intake air temperature (outside temperature) of the engine 5 cannot precisely reflect the engine compartment temperature. Specifically, assuming that the outside temperature is low and the engine 5 and the radiator 3 are not warmed up yet, in a case that warming up of the engine 5 is completed but the radiator 3 is not warmed up, cool air having passed through the radiator 3 reaches the engine 5, so that the engine 5 is cooled from its outer circumferential part and warming up of the engine 5 is delayed. In such a case, the high-temperature air is introduced in the intake passage to increase the intake air temperature and thus delay in warming up of the engine 5 due to the cool air can be prevented. Further, heat radiation from the high-temperature duct 26 to the engine compartment 2 leads to increase in the engine compartment temperature, resulting in increase in the intake air temperature and improvement in warming up of the engine 5.

Second Embodiment

A second embodiment embodying an intake air temperature control device for a vehicle engine according to the present invention is now explained in detail with reference to the accompanying drawings.

In the following explanation, similar components are indicated with the same referential signs with the first embodiment, and explanation thereof is omitted. The following explanation is made with a focus on the differences from the first embodiment.

Figure 8:
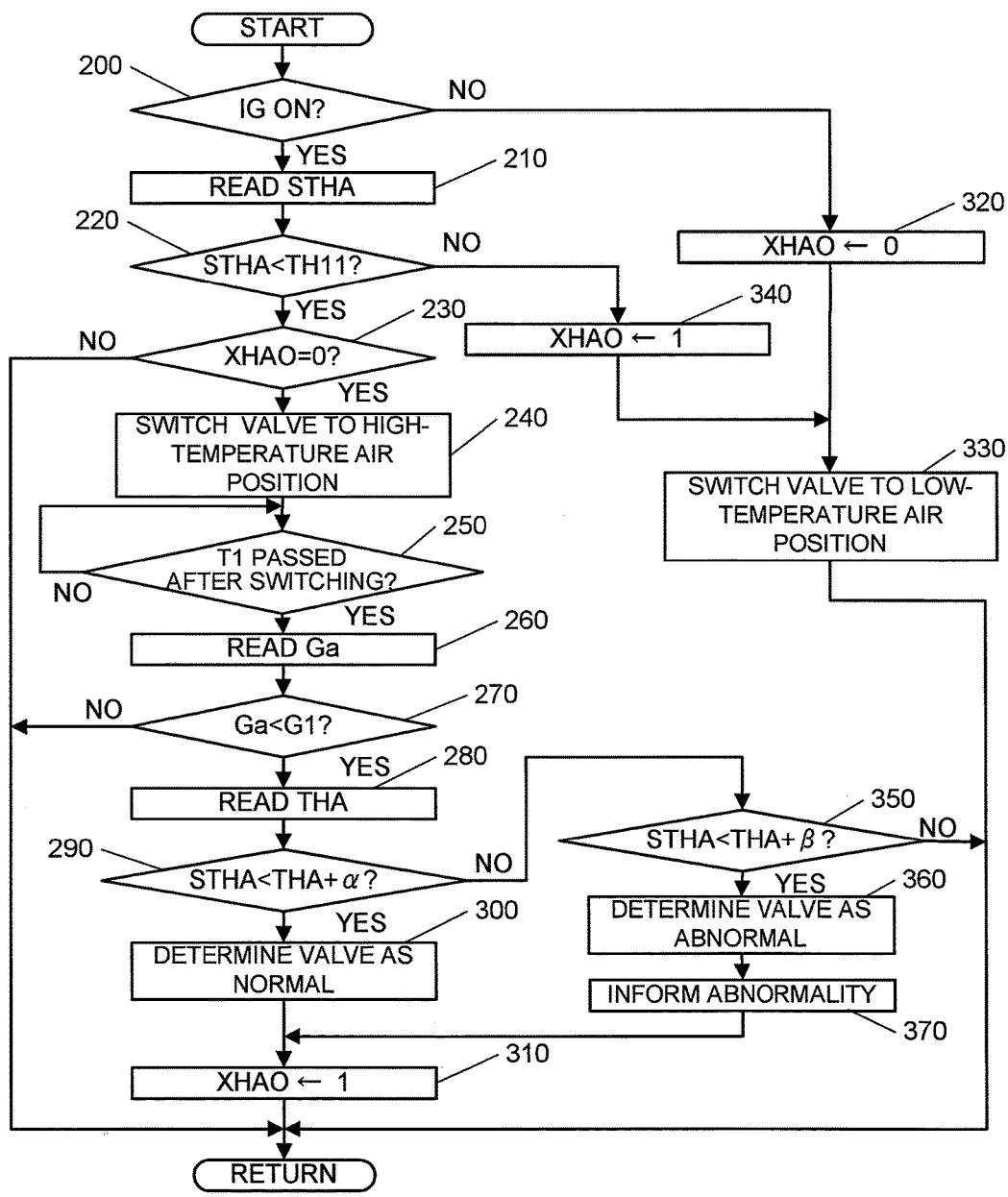
FIG. 8 is a flow chart showing a process of an abnormality detection control in a second embodiment.

In the present embodiment, the ECU 50 is different from the ECU in the first embodiment as for a configuration that an abnormality detection control described below is carried out in addition to the intake air temperature control in FIG. 7. FIG. 8 is a flow chart showing a process of the abnormality detection control.

When the process proceeds to this routine, in a step 200, the ECU 50 determines whether or not IG-on, namely, whether or not the IG switch 44 is on for starting the engine 5. When this determination result is affirmative, the ECU 50 proceeds the process to a step 210, and when the result is negative, the process is moved to a step 320.

In the step 210, the ECU 50 reads an intake air temperature THA as a pre-start intake air temperature STHA which has been detected by the intake air temperature sensor 42 before starting of the engine 5.

Subsequently, in a step 220, the ECU 50 determines whether or not the obtained pre-start intake air temperature STHA is lower than a first predetermined value TH11. As the first predetermined value TH11, for example, "50° C." may be applied. When the determination result is affirmative, the ECU 50 proceeds the process to a step 230, and when the result is negative, the process is moved to a step 340.

In the step 230, the ECU 50 determines whether or not an abnormality detection flag XHAO is "0." This abnormality detection flag XHAO is configured to set to "0" when abnormality detection of the passage switching valve 27 is not completed, and set to "1" when the abnormality detection is completed as it will be explained below. The ECU 50 proceeds the process to a step 240 when the determination result is affirmative, and when the result is negative, the process returns to the step 200.

In the step 240, the ECU 50 controls the passage switching valve 27 to switch to the high-temperature air position shown in FIG. 4.

In a step 250, the ECU 50 switches the passage switching valve 27 to the high-temperature position and waits until a predetermined time T1 has elapsed, and subsequently, the process is shifted to a step 260. As the predetermined time T1, for example, "30 seconds" may be applied.

In the step 260, the ECU 50 obtains an intake air amount Ga based on a detected value of the air flowmeter 43.

Subsequently, in a step 270, the ECU 50 determines whether or not the obtained intake air amount Ga is less than a predetermined amount G1. As for this predetermined amount G1, an intake amount at the time of the low-load combustion may be applied. When the determination result is affirmative, the ECU 50 proceeds the process to a step 280, and when the result is negative, the process returns to the step 200.

In the step 280, the ECU 50 reads the intake air temperature THA at the present time based on the detected value of the intake air temperature sensor 42.

In a step 290, subsequently, the ECU 50 determines whether or not the pre-start intake air temperature STHA is lower than a sum of the present intake air temperature THA and a first predetermined value α. As the first predetermined value α, for example, "30° C." may be applied. When the determination result is affirmative, the ECU 50 proceeds the process to a step 300, and when the result is negative, the process is moved to a step 350.

In the step 300, the ECU 50 determines that the passage switching valve 27 is normally operated. The ECU 50 enables to record this determination result in a built-in memory.

Subsequently, in a step 310, the ECU 50 sets the abnormality detection flag XHAO to "1" since the abnormality detection has been completed, and the process returns to the step 200.

In the step 320 proceeded from the step 200, the ECU 50 sets the abnormality detection flag XHAO to "0." Further, in the step 340 proceeded from the step 220, the ECU 50 sets the abnormality flag XHAO to "1."

Further, in the step 330 proceeded from the step 320 or the step 340, the ECU 50 controls the passage switching valve 27 to switch to the low-temperature air position shown in FIG. 5, and then the process returns to the step 200.

On the other hand, in the step 350 proceeded from the step 290, it is determined whether or not the pre-start intake air temperature STHA is lower than a sum of the present intake air temperature THA and a second predetermined value β. As the second predetermined value β, for example, "10° C." may be applied. When the determination result is affirmative, the ECU 50 proceeds the process to a step 360, and when the result is negative, the process returns to the step 200.

In the step 360, the ECU 50 determines that the passage switching valve 27 is abnormal (malfunctioning). The ECU 50 enables to record this determination result in the built-in memory.

Subsequently, in a step 370, the ECU 50 informs that the passage switching valve 27 is malfunctioning. To be specific, the ECU 50 instructs the alarm lamp 31 to flash to inform abnormality. Then, the ECU 50 proceeds the process to the step 310.

In the above control, the ECU 50 is configured to determine whether or not the passage switching valve 27 is malfunctioning based on changes in the intake air temperature THA which is detected by the intake air temperature sensor 42 before and after the passage switching valve 27 is controlled to switch flow of the high-temperature air and the low-temperature air (outside air). In the present embodiment, the ECU 50 corresponds to one example of an abnormality determination unit of the present invention.

According to the above-mentioned intake air temperature control apparatus for a vehicle engine of the present embodiment, the following operational effects are achieved in addition to the operational effects of the first embodiment. Specifically, the intake air temperature sensor 42 detects the intake air temperature THA in the intake passage downstream of the passage switching valve 27. The ECU 50 determines whether or not the passage switching valve 27 is malfunctioning based on the changes in the intake air temperature THA detected before and after the passage switching valve 27 is controlled to switch the flow between the high-temperature air and the low-temperature air. Accordingly, from the determination result of the passage switching valve 27 being abnormal, it can be notified at an early stage that the passage switching valve 27 is malfunctioning. As a result, a driver can take an action for the malfunction or breakdown of the passage switching valve 27 at an early stage, and thus the engine 5 can be prevented from a secondary breakdown.

For instance, when the valve element 27b of the passage switching valve 27 remains to be positioned in the high-temperature air position and falls into fixing failure, the high-temperature air continues to be introduced in the combustion chamber even after warming up of the engine 5 has been completed, and hence air density of the intake air declines to worsen combustibility of fuel, which could lead to secondary breakdowns such as deterioration of knocking and torque reduction in the engine 5 and inferior fuel efficiency. On the other hand, when the valve element 27b of the passage switching valve 27 remains to be positioned in the low-temperature air position and falls into the fixing failure, there is also a possibility of secondary breakdowns such as generation of condensed water in the intake passage and freezing of the condensed water causing fixation of the throttle valve 12a. In the present embodiment, it is possible to take an action to address the above mentioned breakdowns of the passage switching valve 27 at an early stage, and thus the above mentioned secondary breakdowns can be prevented.

Third Embodiment

A third embodiment embodying an intake air temperature control apparatus for a vehicle engine of the present invention is now explained in detail with reference to the accompanying drawings.

Figure 9:
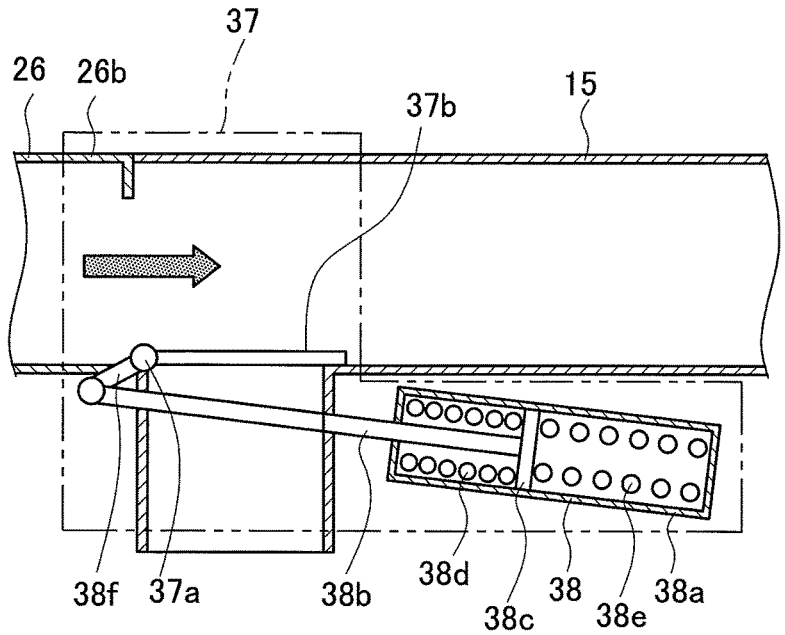
FIG. 9 is a sectional view corresponding to FIG. 4 in a third embodiment.
Figure 10:
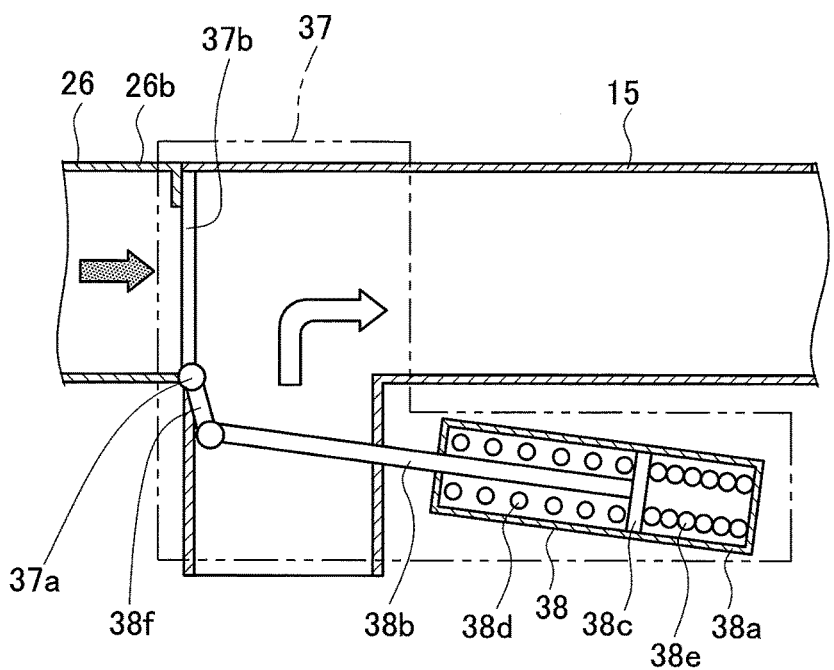
FIG. 10 is a sectional view corresponding to FIG. 5 in the third embodiment.

The present embodiment differs from each of the above mentioned embodiments in a configuration of a passage switching valve. Drawings of FIGS. 9 and 10 respectively correspond to FIGS. 4 and 5. As shown in FIGS. 9 and 10, in the present embodiment, a passage switching valve 37 is constituted by a non-electric mechanical valve. In the present embodiment, the passage switching valve 37 includes a rotary shaft 37a, a valve element 37b provided to be moved by rotation of the rotary shaft 37a, and an actuator 38 to drive the valve element 37b. The actuator 38 is provided with a cylinder 38a, a rod 38b configured to make a stroke motion with respect to the cylinder 38a, a piston 38c formed on a basal end of the rod 38b inside the cylinder 38a, and a first and second springs 38d, 38e which are placed on both sides of the piston 38c inside the cylinder 38a. A leading end of the rod 38b is coupled with the rotary shaft 37a via a linkage mechanism 38f. In the present embodiment, the first spring 38d is made of a shape memory alloy that is allowed to expand or contract in response to the engine compartment temperature so as to drive the valve element 37b. The shape memory alloy corresponds to one example of an expansion and contraction element of the present invention. The actuator 38 is located under the second intake pipe 15 inside the engine compartment 2 such that the engine compartment temperature is easily transmitted to the first spring 38d via the cylinder 38a. When the engine compartment temperature is as low as a predetermined temperature or less, the first spring 38d contracts as shown in FIG. 9 so that the rod 38b is elongated by an urging force of the second spring 38e to place the valve element 37b in the high-temperature air position. On the other hand, when the engine compartment temperature is higher than the predetermined temperature, the first spring 38d expands as shown in FIG. 10 so that the rod 38b is contracted against the urging force of the second spring 38e to place the valve element 37b in the low-temperature air position.

According to the above mentioned intake air temperature control apparatus for a vehicle engine of the present embodiment, in the passage switching valve 37, the first spring 38b made of the shape memory alloy expands or contracts in response to the engine compartment temperature, and thereby the actuator 38 drives the valve element 37b to switch the positions of the valve element 37b between the high-temperature air position and the low-temperature air position. Accordingly, unlike the above first and second embodiments, an electric configuration to drive the passage switching valve 37 is not needed. Therefore, a configuration of the intake air temperature control apparatus can be made simple.

The present invention is not limited to the above embodiments, and may be embodied in partly modified configurations as mentioned below without departing from the scope of the invention.

In the first embodiment, only one opening area 9 is provided between the intake-air inlet port 15a of the second intake pipe 15 and the leading outlet 7a of the guide duct 7. Alternatively, opening areas may be provided in two or more points between the second intake pipe and the guide duct.

In the first embodiment, the filter 8 is provided in the guide duct 7, but this filter may be omitted.

In the first embodiment, the opening portion 6a of the undercover 6 is provided with the guide duct 7, but this guide duct may be omitted.

In the third embodiment, as an expansion and contraction element provided in the actuator 38, the coil-shaped first spring 38d made of a shape memory alloy is provided. As one alternative, the first spring may be a plate spring instead of a coil-shaped spring as long as the spring is made of the shape memory alloy. Further alternatively, a thermo-wax may be provided in the actuator as the expansion and contraction element.

INDUSTRIAL APPLICABILITY

The present invention is utilized for a vehicle such as an automobile including an engine which is provided inside an engine compartment.

REFERENCE SIGNS LIST

1 Vehicle
2 Engine compartment
5 Engine
11 Intake manifold (Intake passage)
12 Throttle device (Intake passage)
13 First intake pipe (Intake passage)
14 Air cleaner (Intake passage)
15 Second intake pipe (Intake passage)
15a Intake air inlet port
21 Exhaust manifold (Exhaust passage)
26 High temperature duct (High-temperature air passage)
27 Passage switching valve
38 Actuator (Drive part)
38d First spring (Valve control unit, expansion and contraction element)
41 Engine compartment temperature sensor (Engine compartment temperature detection unit)
42 Intake air temperature sensor (Intake air temperature detection unit)
50 ECU (Valve control unit, abnormality determination unit)
THEC Engine compartment temperature
THA Intake air temperature

What is claimed is:

1. An intake air temperature control apparatus for a vehicle engine configured to control a temperature of intake air which will be introduced in an engine placed in an engine compartment of a vehicle, the intake air temperature control apparatus comprising:
   an intake passage placed in the engine compartment to introduce the intake air to the engine, the intake passage including an intake air inlet port to introduce outside air as low-temperature air therethrough;
   an exhaust passage partly placed in the engine compartment to discharge exhaust air from the engine;
   a high-temperature air passage placed in the engine compartment and connected to the intake passage to introduce high-temperature air around the exhaust passage to the engine;
   a passage switching valve provided in connecting portions of the intake passage and the high-temperature air passage and configured to switch passages to selectively flow the high-temperature air from the high-temperature air passage and the low-temperature air from the intake air inlet port to a downstream side of the intake passage; and
   a valve control unit to control a switching operation of the passage switching valve according to a temperature inside the engine compartment, wherein
   the intake air temperature control apparatus further includes an engine compartment temperature detection unit to detect the temperature inside the engine compartment as an engine compartment temperature, and
   the valve control unit is configured to control the passage switching valve based on the detected engine compartment temperature.

2. The intake air temperature control apparatus for a vehicle engine according to claim 1,
   wherein the intake air temperature control apparatus further includes:
      an intake air temperature detection unit to detect an intake air temperature in the intake passage downstream of the passage switching valve; and
      an abnormality determination unit to determine abnormality of the passage switching valve, and
      the abnormality determination unit is configured to determine whether or not the passage switching valve is in an abnormal state based on changes in the intake air temperature that is detected before and after the passage switching valve switches passages of the high-temperature air and the low-temperature air.

3. The intake air temperature control apparatus for a vehicle engine according to claim 2,
   wherein the intake air temperature control apparatus further includes an alarm unit to inform abnormality of the passage switching valve, and
   the abnormality determination unit is configured to operate the alarm unit when the passage switching valve is determined to be abnormal.

4. The intake air temperature control apparatus for a vehicle engine according to claim 1,
   wherein the engine compartment is provided with an undercover covering a lower part of the engine compartment and the undercover is provided with an opening portion opening into outside of the vehicle, and the opening portion is provided with a guide duct to direct outside air into the intake air inlet port.

5. The intake air temperature control apparatus for a vehicle engine according to claim 4, wherein the guide duct is provided with a filter to collect foreign matters in the outside air.

6. An intake air temperature control apparatus for a vehicle engine configured to control a temperature of intake air which will be introduced in an engine placed in an engine compartment of a vehicle, the intake air temperature control apparatus comprising:
- an intake passage placed in the engine compartment to introduce the intake air to the engine, the intake passage including an intake air inlet port to introduce outside air as low-temperature air therethrough;
- an exhaust passage partly placed in the engine compartment to discharge exhaust air from the engine;
- a high-temperature air passage placed in the engine compartment and connected to the intake passage to introduce high-temperature air around the exhaust passage to the engine;
- a passage switching valve provided in connecting portions of the intake passage and the high-temperature air passage and configured to switch passages to selectively flow the high-temperature air from the high-temperature air passage and the low-temperature air from the intake air inlet port to a downstream side of the intake passage; and
- a valve control unit to control a switching operation of the passage switching valve according to a temperature inside the engine compartment, wherein
- the passage switching valve includes a valve element to switch passages of the high-temperature air and the low-temperature air and a drive part to drive the valve element,
- the valve control unit includes an expansion and contraction element configured to expand or contract in response to the engine compartment temperature so as to control operation of the drive part,
- the intake air temperature control apparatus further includes:
- an intake air temperature detection unit to detect an intake air temperature in the intake passage downstream of the passage switching valve; and
- an abnormality determination unit to determine abnormality of the passage switching valve, and
- the abnormality determination unit is configured to determine whether or not the passage switching valve is in an abnormal state based on changes in the intake air temperature that is detected before and after the passage switching valve switches passages of the high-temperature air and the low-temperature air.

7. An intake air temperature control apparatus for a vehicle engine configured to control a temperature of intake air which will be introduced in an engine placed in an engine compartment of a vehicle, the intake air temperature control apparatus comprising:
- an intake passage placed in the engine compartment to introduce the intake air to the engine, the intake passage including an intake air inlet port to introduce outside air as low-temperature air therethrough;
- an exhaust passage partly placed in the engine compartment to discharge exhaust air from the engine;
- a high-temperature air passage placed in the engine compartment and connected to the intake passage to introduce high-temperature air around the exhaust passage to the engine;
- a passage switching valve provided in connecting portions of the intake passage and the high-temperature air passage and configured to switch passages to selectively flow the high-temperature air from the high-temperature air passage and the low-temperature air from the intake air inlet port to a downstream side of the intake passage; and
- a valve control unit to control a switching operation of the passage switching valve according to a temperature inside the engine compartment, wherein
- the engine compartment is provided with an undercover covering a lower part of the engine compartment and the undercover is provided with an opening portion opening into outside of the vehicle, and
- the opening portion is provided with a guide duct to direct outside air into the intake air inlet port.

8. The intake air temperature control apparatus for a vehicle engine according to claim 7, wherein the guide duct is provided with a filter to collect foreign matters in the outside air.

* * * * *